Patented June 30, 1936

2,046,174

UNITED STATES PATENT OFFICE 2,046,174

CELLULOSE DERIVATIVE SOLUTIONS AND PROCESS OF MAKING THE SAME

Alfred Stoyell Levesley, Saltcoats, and James Craik, Stevenston, Scotland, assignors to Imperial Chemical Industries Limited, a corporation of Great Britain No Drawing. Application September 7, 1933, Serial No. 688,432. In Great Britain September 29, 1932

20 Claims. (Cl. 260—152)

This invention relates to the manufacture of solutions of cellulose derivatives and more particularly to caustic alkali solutions thereof.

It is known that cellulose derivatives can be obtained, which in the ordinary way are insoluble in water and incapable of substantially complete solution in dilute aqueous caustic soda but which can be brought into solution in aqueous caustic soda by cooling (in some cases for a predetermined time) below 0° C. until crystals of ice appear and subsequently allowing the mixture to warm up to ordinary atmospheric temperature.

This invention has as an object the provision of a process whereby cellulose derivatives insoluble at ordinary temperatures but soluble at freezing temperatures in dilute soda may be brought into solution without the use of extremely low temperatures with their consequent disadvantages. A further object is the preparation of shaped articles, films, threads, sheets and the like from these solutions. Other objects will appear hereinafter.

These objects are accomplished by the following invention wherein a mixture of the cellulose derivative and aqueous caustic soda is subjected, with or without the addition of a dispersing agent, to the action of a colloid mill, the latter being machines distinguished by their shearing action exerted by hydraulic forces.

Any of the well known colloid mills can be used for obtaining the fine dispersion required but it is preferred to use a mill of smooth surface type, for example the Premier emulsifying and disintegrating machine, since there is less heating effect with this type of mill than with the roughened or grooved surface type. Other equivalent mills, for example those described in Travis' Mechanochemistry and the Colloid Mill, may be used. The setting of the mill is in some cases important more particularly when rather viscous solutions are obtained. In general it is advisable to have the mill set fairly wide, that is, with a clearance of 8–10 thousandths of an inch rather than to use too fine a clearance, and to pass the solution through twice, with, if it is desired, a reduced clearance on the second pass. With the wider setting there is less heating effect and this is advantageous more particularly when the solutions obtained are of rather high viscosity. The development of unduly high temperatures is avoided because, among other reasons, of the fact that although solutions may be obtained at such temperatures, they may gelate on cooling. This is particularly the case when the solutions are of rather high viscosity.

In practice the original temperature of the mixture is arranged so that the temperature of the mixture while running in the machine does not much exceed ordinary atmospheric temperature, is preferably under 25° C., and in any case does not exceed approximately 40° C.

The concentration limits for the caustic soda solution depend on the exact composition of the cellulose derivative used, on the temperature, the concentration, the degree of clarity required, and other factors not as yet well understood but it has been found that in most cases the concentration for the best results lies between 5 and 10%. A certain measure of latitude is present and the most appropriate region of concentration may be determined in particular cases with little difficulty.

Where dispersing agents are employed only small quantities are necessary, for example of the order of 1% coagulated on the solid cellulose derivative. Larger quantities may, however, be used.

In carrying out the invention in one form a fine slurry is made by stirring at high speed for about 5 minutes a mixture of the cellulose derivative and aqueous caustic soda. The mixture is then preferably cooled, say to 10° C., then subjected to the action of the colloid mill once or oftener and the solution so obtained may be filtered if necessary, freed from air, and used for the purposes outlined herein. Colloid or other dispersing agents may, of course, be present. The cellulose derivative need not, in certain cases, be separated from the reaction mass in which it is prepared but may be brought into solution in its crude form.

The invention is illustrated but not limited by the following examples in which the parts are by weight.

Example 1

40 parts of hydroxyethyl cellulose (glycol ether of cellulose) incapable at ordinary temperatures of substantially complete solution in dilute soda of any concentration, and made by causing etherification to take place at ordinary temperatures between 11 parts of ethylene oxide in the vapor state, and 162 parts of cellulose in the form of soda cellulose crumbs, are well stirred into 960 parts of a solution of caustic soda containing 75 parts of sodium hydroxide and 885 parts of water, at room temperature. When the glycol cellulose has thoroughly disintegrated the fibrous viscous mixture is cooled to 10° C. and is then passed through a colloid mill of the smooth surface type, the setting of the mill being 8-10 thousands of an inch. When all the fluid has passed through the mill, the setting of the mill is adjusted to 3-5 thousandths of an inch and the solution run through a second time. The resulting solution is practically complete and can be very easily filtered free from fiber and sucked free from air by application of reduced pressure. It is then suitable for the preparation of films, threads, etc., by coagulation with acids or salt solution.

Example 2

100 parts of reaction mass, obtained by causing etherification to take place at ordinary temperature between 11 parts of ethylene oxide in the vapor state and 162 parts of cellulose in the form of soda cellulose crumbs, containing approximately 35% glycol cellulose, 16% sodium hydroxide and 49% water, are suspended in a caustic soda solution containing 24 parts of sodium hydroxide, 0.35 parts of the substance known by the registered trade-mark Perminal (isopropylated naphthalene sulfonate) and 376 parts of water. The whole is stirred thoroughly until the reaction mass is disintegrated and then passed through a colloid mill of the smooth surface type, the setting of the mill being adjusted to 8-10 thousandths of an inch. The resulting solution is filtered, if necessary, and sucked free from air.

Example 3

15 parts of hydroxyethyl cellulose (glycol ether of cellulose) obtained as described in Example 1, 235 parts of aqueous sodium hydroxide solution containing 20 parts of sodium hydroxide and 215 parts of water are intimately mixed by vigorous stirring after the addition of 0.15 parts of Turkey red oil. The mass so obtained is cooled to about +10° C. and is then passed through a colloid mill of the smooth surface type, the setting of the mill being 6 thousandths of an inch. The resulting solution is filtered and deaerated and can be used for the preparation of clear, strong, flexible films.

Example 4

50 parts of hydroxyethyl cellulose (glycol ether of cellulose) incapable at ordinary temperature of substantially complete solution in dilute soda of any concentration, and made by causing etherification to take place without extraneous supply of heat between 50 parts of 41% ethylene chlorhydrin and 162 parts of cellulose in the form of soda cellulose crumbs made from wood pulp boards, containing 92% of alpha cellulose, are well stirred into 950 parts of an 8% aqueous solution of sodium hydroxide. The resulting mass is cooled to 10° C. and passed through a colloid mill of the smooth surface type, the setting of the mill being 7 thousandths of an inch. A good solution is obtained in this way which filters completely and can be used for the preparation of fibers, threads, etc. by coagulation with acids or salt solutions.

Example 5

Methyl cellulose incapable at ordinary temperature of substantially complete solution in any concentration of caustic soda is prepared as disclosed in British application No. 8,280 of 1933, granted as British Patent 416,590 as follows:

216 parts of air-dry α-wood boards containing 8 percent of moisture, are shredded in a Werner Pfleiderer or other suitable incorporator for 24 hours with 388 parts of 20% caustic soda. The alkali cellulose so obtained is kept at about 20° C. for 18 hours and is then cooled to a temperature between 0° and 5° C., either in the above incorporator or other suitable vessel fitted with an agitator. 80 parts of dimethyl sulfate are slowly added over a period of about 30-45 minutes, stirring being continued throughout the addition and the temperature being maintained at 4° C.-6° C. Mixing is continued for a further period of 2½ hours.

At the end of this time the product is isolated by acidification with 2% sulfuric acid or simply extracted with water. After thorough washing, and drying if desired, it can be stored. 50 parts of the resulting methyl cellulose is well stirred into 950 parts of a 10% aqueous sodium hydroxide solution. The resulting mass is cooled to 10% C. and passed through a colloid mill of the smooth surface type, the setting of the mill being 8 thousandths of an inch. When all the fluid has passed through the mill the setting of the mill is adjusted to 5 thousandths of an inch and the solution run through a second time. The resulting solution is practically complete and can be filtered, deaerated and used in the preparation of fibers, sheets, etc.

The invention is of particular application to hydroxy alkyl ethers of cellulose containing low percentages of hydroxy alkyl groups, which are insoluble in water and have hitherto only been substantially completely dissolved in caustic soda by cooling until crystallization occurs and thereafter allowing the mass to warm up to room temperatures. It can also be applied to such materials, as alkyl ethers of cellulose as are incapable of substantially complete solution in dilute caustic soda at ordinary temperature but which can be brought into solution by cooling until crystals of ice appear and subsequently allowing the solution to warm to ordinary atmospheric temperature, that is, 20-25 or even 30° C. As suitable cellulose derivatives there may be named low substituted methyl, ethyl, hydroxyethyl, hydroxypropyl, and dihydroxypropyl cellulose, as well as cellulose glycollic acid, celluloseoxypropionic acid, celluloseoxybutyric acid, celluloseoxyvaleric acid. In general, the suitable derivatives contain less than 1 substituent group per glucose unit of the cellulose molecule and preferably contain one substituent group per four glucose units.

In addition to the dispersing agents mentioned in the examples other dispersing agents may be used such as alkyl aryl sulfonates, mineral oil sulfonates, aromatic sulfonic acids and salts thereof, monobenzyl alkaline sulfonates, sulfite cellulose lye, alkali soluble celluloses, water- and alkali-cellulose derivatives, condensation products of formaldehyde and naphthalene sulfonic acids, sulfonated fatty oils, sulfonated fish oils, "Prestabitols" (see Fietzer's Textil-Hilfsmittel-Tabellen 1933, pp. 143-6), Turkey red oils, alkalated polynuclear sulfonic acids and their soluble salts etc. Protective colloids such as gelatin, glue, paste or solution of starch and starch-like substances, gums, etc., may be used.

The solutions obtained according to the present invention may be used preferably after filtering and deaerating for the manufacture of films, artificial threads, artificial horsehair and the like, or in cloth filling compositions, textile finishing compositions and the like.

As many apparently widely different embodiments of this invention may be made without departing from the spirit and scope thereof, it is to be understood that we do not limit ourselves to the specific embodiments thereof except as defined in the appended claims.

We claim:

1. Process for increasing the solubility of cellulose ethers having less than one substituent group per glucose unit which are insoluble in water and incapable of complete solution in dilute aqueous caustic soda at ordinary temperatures but soluble in aqueous caustic soda by cooling below 0° C. until crystals of ice appear and subsequently allowing the mixture to warm to atmospheric temperature, which comprises subjecting a mixture of the cellulose ether and aqueous caustic soda to the action of a colloid mill, the mixture being maintained at a temperature of about 10 to about 40° C.

2. Process of claim 1 wherein a dispersing agent is added to the mixture of cellulose ether and aqueous caustic soda.

3. Process for increasing the solubility of hydroxy alkyl ethers of cellulose having less than one hydroxyalkyl radical per glucose unit of the cellulose which are insoluble in water and incapable of complete solution in dilute aqueous caustic soda at ordinary temperatures but which can be brought into solution in aqueous caustic soda by cooling below 0° C. until crystals of ice appear and subsequently allowing the mixture to warm to atmospheric temperature, which comprises subjecting a mixture of said hydroxy alkyl ether of cellulose and aqueous caustic soda to the action of a colloid mill, the mixture being maintained at a temperature of about 10 to about 40° C.

4. Process for increasing the solubility of hydroxyethyl ethers of cellulose having less than one hydroxyethyl radical per glucose unit of the cellulose which are insoluble in water and incapable of complete solution in dilute aqueous caustic soda at ordinary temperatures but which can be brought into solution in aqueous caustic soda by cooling below 0° C. until crystals of ice appear and subsequently allowing the mixture to warm to atmospheric temperature, which comprises subjecting a mixture of said hydroxyethyl ether of cellulose and aqueous caustic soda to the action of a colloid mill, the mixture being maintained at a temperature of about 10 to about 40° C.

5. Process of claim 4 wherein the colloid mill is of the smooth surface type.

6. Process for increasing the solubility of hydroxyethyl ethers of cellulose having less than one hydroxyethyl radical per glucose unit of the cellulose which are insoluble in water and incapable of complete solution in dilute aqueous caustic soda at ordinary temperatures but which can be brought into solution in aqueous caustic soda by cooling below 0° C. until crystals of ice appear, which comprises subjecting a mixture of the hydroxyethyl ether of cellulose and aqueous caustic soda twice to the action of a colloid mill, the mixture being maintained at a temperature of about 10 to about 40° C.

7. A solution of a cellulose ether prepared according to the process of claim 1.

8. A solution of a hydroxyethyl ether of cellulose prepared according to the process of claim 3.

9. A solution of a hydroxyethyl ether of cellulose prepared according to the process of claim 4.

10. A cellulosic structure prepared by the coagulation of a solution of a cellulose ether having less than one substituent group per glucose unit of the cellulose which is insoluble in water and incapable of complete solution in dilute aqueous caustic soda at ordinary temperatures but which can be brought into solution in aqueous caustic solution at 0° C. until crystals of ice appear and subsequently allowing the mixture to warm to atmospheric temperature, said solution being prepared by subjecting a mixture of the cellulose ether and aqueous caustic soda to the action of a colloid mill, the mixture being maintained at a temperature of about 10 to about 40° C.

11. Process for increasing the solubility of cellulose ethers having less than one substituent per glucose unit of the cellulose which are insoluble in water and incapable of complete solution in dilute aqueous caustic soda at ordinary temperatures but soluble in aqueous caustic soda by cooling below 0° C. until crystals of ice appear and subsequently allowing the mixture to warm to atmospheric temperature, which comprises subjecting a mixture of the cellulose ether and 5–10% aqueous caustic soda to the action of a colloid mill, the mixture being maintained at a temperature of about 10 to about 25° C.

12. Process of claim 11 wherein a dispersing agent is added to the mixture of cellulose ether and aqueous caustic soda.

13. Process for increasing the solubility of hydroxyalkyl ethers of cellulose having less than one hydroxyalkyl radical per glucose unit of the cellulose which are insoluble in water and incapable of complete solution in dilute aqueous caustic soda at ordinary temperatures but which can be brought into solution in aqueous caustic soda by cooling below 0° C. until crystals of ice appear and subsequently allowing the mixture to warm to atmospheric temperature, which comprises subjecting a mixture of said hydroxyalkyl ether of cellulose and 5–10% aqueous caustic soda to the action of a colloid mill, the mixture being maintained at a temperature of about 10 to about 25° C.

14. Process for increasing the solubility of hydroxyethyl ethers of cellulose having less than one hydroxyethyl radical per glucose unit of the cellulose which are insoluble in water and incapable of complete solution in dilute aqueous caustic soda at ordinary temperatures but which can be brought into solution in aqueous caustic soda by cooling below 0° C. until crystals of ice appear and subsequently allowing the mixture to warm to atmospheric temperature, which comprises subjecting a mixture of said hydroxyethyl ether of cellulose and 5–10% aqueous caustic soda to the action of a colloid mill, the mixture being maintained at a temperature of about 10 to about 25° C.

15. Process of claim 14 wherein the colloid mill is of the smooth surface type.

16. Process for increasing the solubility of hydroxyethyl ethers of cellulose having less than one hydroxyethyl radical per glucose unit of the cellulose which are insoluble in water and incapable of complete solution in dilute aqueous caustic soda at ordinary temperatures but which can be brought into solution in aqueous caustic soda by cooling below 0° C. until crystals of ice appear, which comprises subjecting a mixture of the hydroxyethyl ether of cellulose and aqueous caustic soda twice to the action of a colloid mill, the mixture being maintained at a temperature of about 10 to about 25° C.

17. A solution of a cellulose ether prepared according to the process of claim 11.

18. A solution of a hydroxyethyl ether of cellulose prepared according to the process of claim 13.

19. A solution of a hydroxyethyl ether of cellulose prepared according to the process of claim 14.

20. A cellulosic structure prepared by the coagulation of a solution of a cellulose ether insoluble in water and incapable of complete solution in dilute aqueous caustic soda at ordinary temperatures but which can be brought into solution in aqueous caustic solution by cooling below 0° C. until crystals of ice appear and subsequently allowing the mixture to warm to atmospheric temperature, said solution being prepared by subjecting a mixture of the cellulose ether and 5-10% aqueous caustic soda to the action of a colloid mill, the mixture being maintained at a temperature of about 10 to about 25° C.

ALFRED STOYELL LEVESLEY.
JAMES CRAIK.